United States Patent [19]

Walker

[11] 4,150,836
[45] Apr. 24, 1979

[54] BACKED BOSS SEAL FITTING

[75] Inventor: James V. Walker, Redondo Beach, Calif.

[73] Assignee: McDonnell Douglas Corporation, Long Beach, Calif.

[21] Appl. No.: 769,182

[22] Filed: Feb. 16, 1977

[51] Int. Cl.² ............................................. F16J 15/26
[52] U.S. Cl. ..................... 277/188 A; 277/DIG. 2; 285/212; 285/DIG. 18
[58] Field of Search ............... 185/212, 220, 355; 277/207 A, 188 A, 168, 206; 285/DIG. 18

[56] References Cited
U.S. PATENT DOCUMENTS

| | | |
|---|---|---|
| 3,132,869 | 5/1964 | Campbell ........................ 277/188 A |
| 3,184,246 | 5/1965 | Kline ................................ 277/168 |
| 3,759,552 | 9/1973 | Levinsohn et al. ............... 285/212 |

Primary Examiner—Robert I. Smith
Attorney, Agent, or Firm—George W. Finch; Walter J. Jason; Donald L. Royer

[57] ABSTRACT

A fitting for establishing a sealed connection with a boss which fitting includes a concentric depression about the innermost portion of its boss engaging surface, which retains a backup ring of special cross-section by means of an inwardly facing circumferential surface therein, the ring, being constructed from material which creeps when subjected to force over an extended length of time, combining with the depression to control the deformation of an adjacent O-ring so that any gapping adjacent the O-ring is of insufficient size to allow extrusion thereof and seal failure.

15 Claims, 5 Drawing Figures

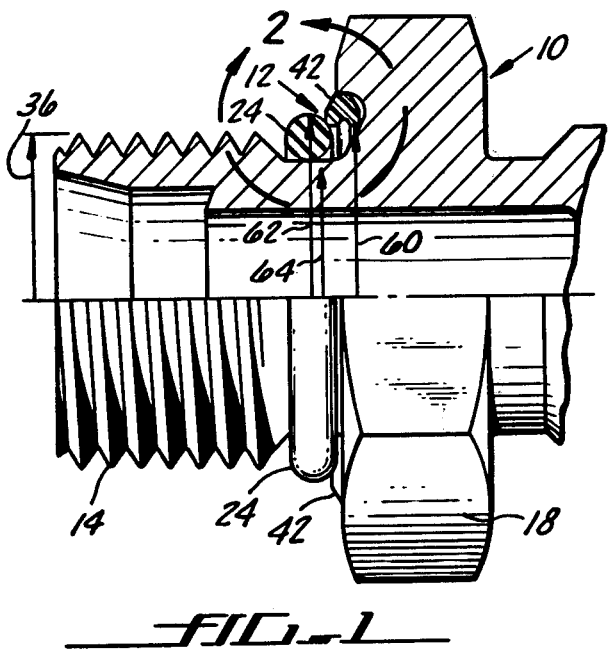
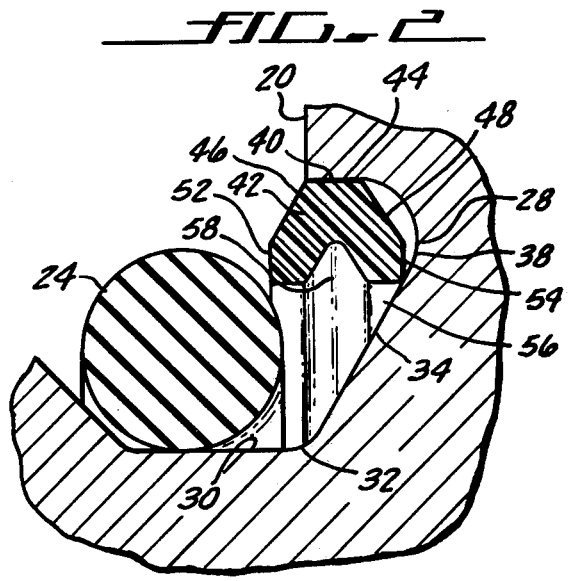
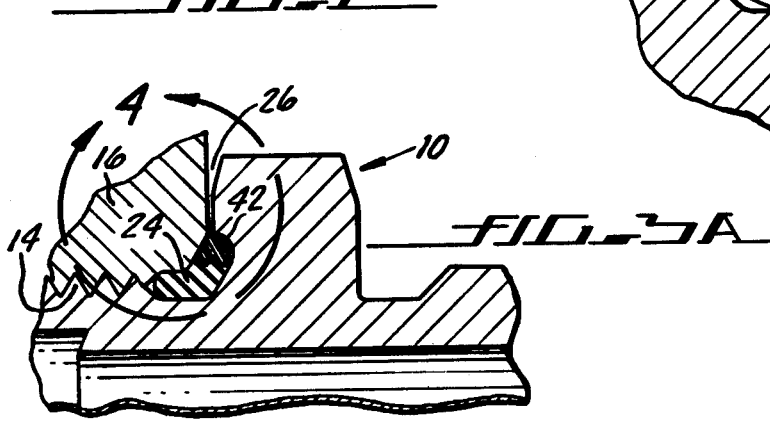
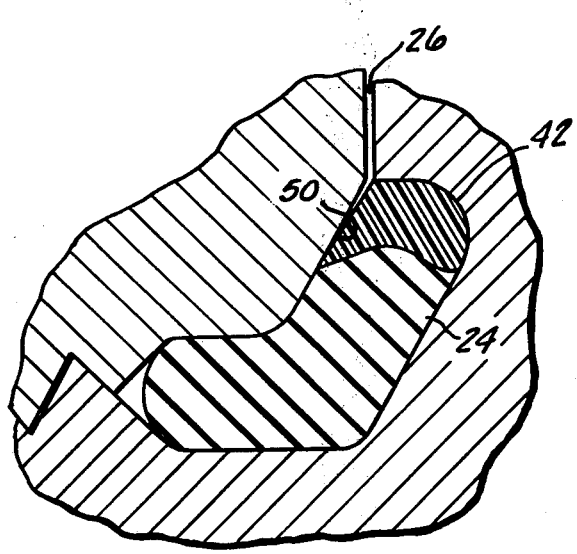
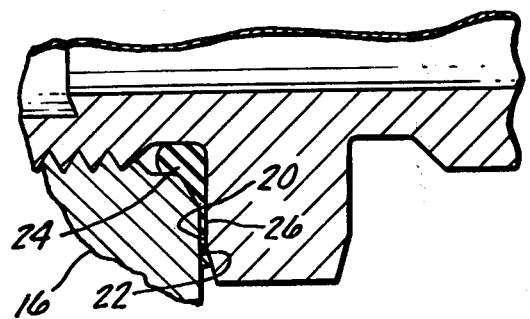
PRIOR ART

BACKED BOSS SEAL FITTING

BACKGROUND OF THE INVENTION

Many high cost hydraulic equipment items such as pumps, reservoirs, valves and cylinders have hydraulic fluid ports in the form of bosses, each consisting of an internally threaded hole with a chamfered face surface. The bosses are designed to mate with appropriate replaceable fittings, each fitting and boss forming an annular cavity in which a rubber O-ring is installed to form a seal. In aerospace applications, such seals must withstand repeated applications of 3000 psi (20,000 kPa) hydraulic pressure, and under certain conditions transient pressures with peaks of 4500 psi (30,000 kPa). These peaks tend to stress the fitting with respect to the boss and open extrusion gaps at the metal to metal interface therebetween. The extrusion gaps to which the rubber O-ring seals are normally exposed are very minute. However, the angularity tolerance between the threads of the boss and the boss face can result in sufficient gapping especially in larger sizes to drastically reduce the life of the O-ring seal in the boss. This is because rubber under high pressure acts almost like a fluid and if the extrusion gap to which it is exposed is sufficiently large, the rubber of the O-ring can be forced therethrough with resultant seal failure. Such failures currently account for a major percentage of the failures encountered in aircraft hydraulic systems.

Previous attempts to solve fitting to boss sealing problems are also discussed in U.S. Pat. No. 3,730,563. In that patent the O-ring was completely eliminated through design of a lip seal. Such fittings typically leak slightly in response to design over pressures but do not fail. However, aircraft mechanics look for any leakage as an indication of seal failure and therefor such fittings were not universally accepted. The problem was partially solved by the modification of the lip seal fitting and the addition of a backup ring and an O-ring as shown in U.S. Pat. No. 3,850,456. The backup ring only properly positioned the O-ring and did not reduce the gap extrusion problem.

BRIEF SUMMARY OF THE PRESENT INVENTION

The present invention further solves the fitting to boss leakage problem by providing an improved seal system which can be incorporated into standard boss fittings with a minimum of machining and expense. In the present invention, a small concentric depression is machined in what would otherwise be the radial sealing face of a boss fitting. The depression is arranged so that it gradually gets deeper as it extends radially outward until it makes a smooth curve to a concentric inwardly facing ring surface. An initially symmetrical backup ring having a truncated generally triangular cross-section is positioned with its truncated apex adjacent the concentric inwardly facing ring surface of the depression. The backup ring is of about the same volume as the material machined from the fitting and is preferably constructed from material such as tetrafluroethylene which cold flows with time and pressure and has a relatively low coefficient of friction. The cross-section of the ring is symmetrical so it cannot be installed backwards. In use, it gradually conforms to the shape of the cavity formed by the depression and the boss.

An O-ring is installed in what would be its normal position in a conventional fitting. The O-ring and fitting threads thereafter restrain the backup ring in proper position. When the fitting is installed in a boss, the backup ring controls the gapping such that a sufficient gap never exists for the O-ring to be extruded to cause seal failure.

It is, therefore, an object of the present invention to provide improved sealing means which can be incorporated into standard boss fittings.

Another object is to provide improved seal means for boss fittings which are relatively economical to manufacture and install.

Another object is to provide a boss fitting with an improved seal arrangement which can replace most releasable connections in aircraft hydraulic systems without any modification to the boss forming component.

Another object is to improve the reliability of high pressure hydraulic systems.

Another object is to prevent the extrusion of O-ring seals in boss to fitting connections.

These and other objects and advantages of the present invention will become apparent to those skilled in the art after considering the following detailed specification in connection with the accompanying drawing wherein:

BRIEF DESCRIPTION OF THE DRAWING

FIG. 1 is a partial cross-sectional view of a portion of a fitting with a seal arrangement constructed according to the present invention.

FIG. 2 is an enlarged cross-sectional view of the seal components taken from area 2 of FIG. 1.

FIG. 3A is a partial cross-sectional view of the upper half of the fitting and seal of FIGS. 1 and 2 newly installed in a boss and being subjected to overpressures.

FIG. 3B is a partial cross-sectional view of the lower half of a prior art fitting and seal installed in a boss and being subjected to overpressures.

FIG. 4 is an enlarged cross-sectional view similar to area 4 of FIG. 3A of the seal components of the present invention after they have been subjected to pressures for an extended period under conditions sufficient to fail common O-ring seals.

DETAILED DESCRIPTION OF THE SHOWN EMBODIMENT

Referring to the drawings more particularly by reference numbers, number 10 in FIG. 1 refers to a fitting employing the seal system 12 of the present invention. The fitting 10 includes a threaded portion 14 at one end thereof which is adapted to threadably engage a female boss 16 which is shown in FIGS. 3A and 3B. The fitting 10 is tightened into the boss 16 by means of a wrench applied to the hexagonal central portion 18 thereof. When twisted the threaded portion 14 draws the fitting 10 down into the boss 16. In conventional fittings this action draws a radial side surface 20 adjacent the hexagonal portion into abutment with a boss face 22 on the boss as shown in FIG. 3B. An O-ring 24 is usually provided to form a leak tight seal. When subjected to overpressures, however, the surface 20 and the face 22 can be forced apart leaving a gap 26 through which the O-ring 24 can be extruded by high pressures passing through the thread interface between the boss 16 and the fitting 10. This is shown in an exaggerated manner in FIG. 3B. To solve this problem, the present fitting 10 is modified slightly as shown in FIG. 2 wherein the surface 20 has a concentric cutout 28 formed therein. The cutout 28 extends from the thread relief 30 of the fitting 10 by means of a smooth curve 32 to a frusto-conical portion 34, which extends generally radially outward just beyond the radius 36 of the threaded portion 14 where it is faired by a smooth curved, semi-toroidal portion 38 into an inwardly facing cylindrically surfaced ring portion 40 which extends to the face 20 at an approximate right angle thereto. The cutout 28 provides a pocket to retain a backup ring 42.

The backup ring 42 is preferably constructed from materials such as tetrafluroethylene which creep in response to pressure and time but are relatively rigid in their response to transient pressures. The backup ring 42 has a bilaterally symmetric cross-section which can be generally described as a truncated triangle. This results in the ring 42 having a cylindrical outer surface 44 which is sized to mate with the ring surface 40 which prevents radial outward expansion thereof. Adjacent both sides of the cylindrical surface 44, the ring 42 has chamfered surfaces 46 and 48 of an angle which generally mates with the conventional chamfered portion 50 of the boss 16. The chamfered surfaces 46 and 48 extend to the parallel side surfaces 52 and 54 whose shape is more the natural result of the normal manufacturing process for the backup ring 42 than a design feature thereof, the rings being machined from a tube of raw material. The inner surface 56 of the ring 42 has a volume approximately equal to that of the metal removed to form the cutout 28. When this occurs, standard O-rings 24 can be used.

The ring 42 is bilaterally symmetric in the preferred embodiment so that a mechanic can install it with surfaces 48 and 54 facing the cutout 28 or facing away therefrom. The radius 60 formed by the undersurface 56 is preferably just larger than the radius 36 of the threaded portion 14 yet smaller than the outer radius 62 of the O-ring 24. Therefore, once a backup ring 42 and its associated O-ring 24 is installed on a fitting 10, the O-ring 24 acts as a retainer for the backup ring 42 so that it is not lost. The O-ring 24 is retained in the thread relief 30 by the threaded portion 14, whose radius 36 is larger than the inner diameter 64 of the O-ring 24 when it is in its relaxed state.

When the fitting 10 is installed in the boss 16 the O-ring 24 is deformed to form a seal, as shown in FIG. 3A, with the backup ring 42 blocking the O-ring's 24 access to any gap 26 which might form between the boss 16 and the fitting 10.

As aforesaid, the backup ring 42 is constructed from materials like Teflon which creep or deform when subjected to forces over an extended length of time. In FIG. 4, the ring 42 is shown after an extended length of service where it has deformed to conform to the shape of the cutout 28 and the chamfered boss surface 50. The time period during which the gaps 26 form is too short for the backup ring 42 to be extruded therein, yet it deforms in the area between the gap 26 and the deformed O-ring 24 so that no sufficient gap exists through which the O-ring 24 can be extruded. The deformed backup ring 42 of FIG. 4 has the cross-section of an actual ring which had been subjected to overpressures in a test fixture for the equivalent of ten years of actual service.

Therefore, there has been shown and described a fitting having a novel sealing system for improving the sealing between the fitting on a boss which is especially useful in connecting hydraulic lines and which fulfills all the objects and advantages sought therefore. Any changes, modifications, variations of the uses and applications of the subject invention will, however, become apparent to those skilled in the art after considering this specification and the accompanying drawing. All such changes, modifications, variations and other uses and applications which do not depart from the spirit and scope of the invention are deemed to be covered by the invention which is limited only by the claims which follow.

What is claimed is:

1. A fitting for maintaining a sealed connection with a threaded boss, said fitting including:
   a threaded portion for threadably engaging the boss;
   a radial boss engaging surface;
   a thread relief portion adjacent said threaded portion; and
   a cutout portion in said radial boss engaging surface adjacent said thread relief portion, said cutout portion being shaped to receive a backup ring and to retain the ring in a predetermined position against the boss when said fitting is threadably engaged therewith, said cutout portion being defined by a frusto-conical surface concentric to and adjacent said thread relief portion, an annular surface, having a semi-circular cross-section, connected to said frusto-conical surface, and a cylindrical surface which extends from said annular surface to said radial boss engaging surface.

2. The fitting defined in claim 1 including a backup ring of a predetermined shape and volume positioned in said cutout portion, said volume of said ring being substantially identical to the volume of said cutout portion.

3. The fitting defined in claim 2 wherein said backup ring when first installed is bilaterally symmetric.

4. The fitting defined in claim 3 wherein said backup ring has an outer cylindrical surface of a diameter to mate with said cylndrical surface of said cutout.

5. The fitting defined in claim 4 wherein said backup ring has opposite side surfaces with inner portions which are perpendicular to said outer cylindrical surface and chamfered portions between said inner portions and said outer cylindrical surface.

6. The fitting defined in claim 5 wherein said backup ring has a concave inner ring surface.

7. The fitting defined in claim 2 wherein said backup ring is constructed from material which creeps in response to time and pressure whereby when said fitting is installed said backup ring gradually deforms to the shape of said cutout portion at its cylindrical and annular surfaces and a portion of said frusto-conical surface adjacent said annular surface.

8. The fitting defined in claim 7 wherein said material is tetrafluroethylene.

9. The fitting defined in claim 2 including an O-ring having when unstressed an inner diameter which is smaller than the outer diameter of said threaded portion and positioned adjacent said threaded portion and said backup ring in said thread relief portion.

10. A fitting system for sealed connection to a boss, said fitting including:
   means for releasable engagement with the boss;
   a radial, boss contacting surface;
   a relief portion adjacent said means for releasable engagement with the boss;
   a ring shaped cavity in said radial, boss contacting surface adjacent said relief portion;

a backup ring of a predetermined shape and volume, said volume of said ring being substantially identical to the volume of said cavity in said radial, boss contacting surface, said backup ring being positioned in said cavity; and a circular, compliant sealing member in said relief portion adjacent said backup ring.

11. The fitting system defined in claim 10 wherein said cavity is defined by:

a frustro-conical surface concentric to and adjacent said relief portion, in cross-section said frustro-conical surface making an obtuse angle with said relief portion;

an inner cylindrical surface which extends from said radial, boss contacting surface and is concentric to said frustro-conical surface; and a smoothly curved surface connecting said frustro-conical surface and said inner cylindrical surface.

12. The fitting system defined in claim 10 wherein said back-up ring is constructed from material which creeps in response to time and pressure whereby the portion of said back-up ring in contact with said cavity gradually deforms to the shape of the contacted portion of said cavity.

13. The fitting system defined in claim 12 wherein said backup ring is bilaterally symmetric when first installed in said cavity.

14. The fitting system defined in claim 10 wherein said cavity includes an interior cylindrical surface of a predetermined diameter adjacent said radial, boss contacting surface, said backup ring having an outer cylindrical surface of the predetermined diameter whereby the two cylindrical surfaces are in mating contact.

15. The fitting system defined in claim 14 wherein said backup ring has opposite side surfaces with inner portions which are perpendicular to said outer cylindrical surface, chamfered portions between said inner portions and said outer cylindrical surface, a concave inner ring surface and inner cylindrical ring surfaces between said opposite side surfaces and said concave inner ring surface.

* * * * *